Oct. 28, 1930.  J. S. KEEN ET AL  1,780,082
TWO-WHEEL LOCOMOTIVE TRUCK
Filed March 28, 1930   3 Sheets-Sheet 1
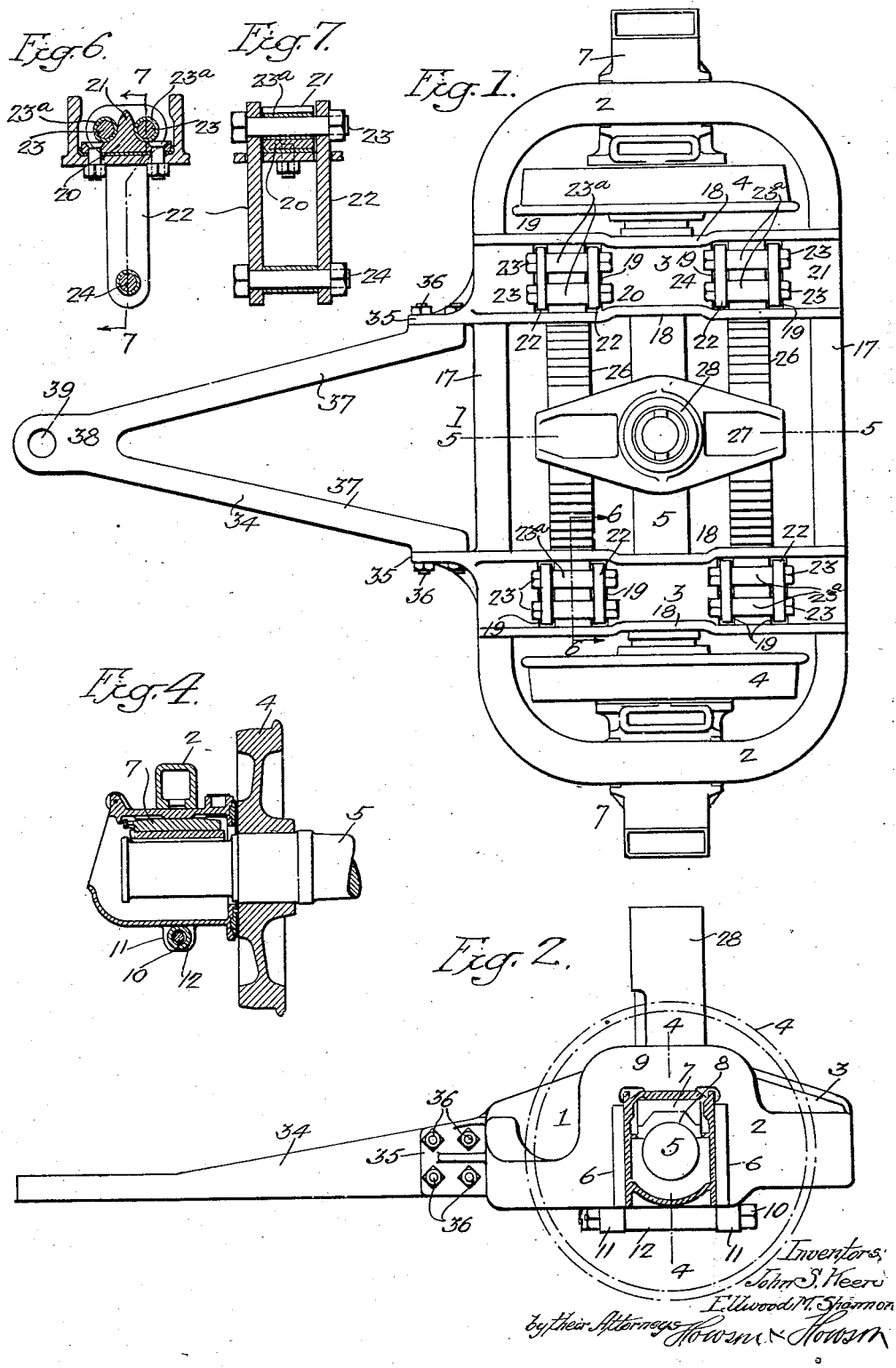

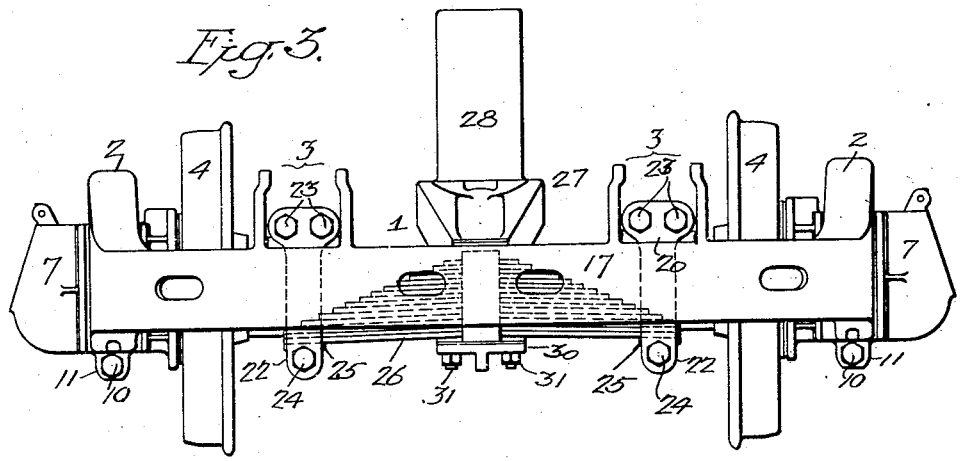

Oct. 28, 1930.  J. S. KEEN ET AL  1,780,082
TWO-WHEEL LOCOMOTIVE TRUCK
Filed March 28, 1930  3 Sheets-Sheet 3

Inventors
John S. Keen
E. Elwood M. Shannon
By their Attorneys
Howson & Howson

Patented Oct. 28, 1930

1,780,082

UNITED STATES PATENT OFFICE

JOHN S. KEEN, OF PHILADELPHIA, AND ELLWOOD M. SHANNON, OF BALA, PENNSYLVANIA

TWO-WHEEL LOCOMOTIVE TRUCK

Application filed March 28, 1930. Serial No. 439,791.

This invention relates to certain improvements in locomotive trucks of the two-wheel type, in which the bearings for the axle are on the outside of the wheels. This truck is preferably supplied with a radius bar to allow it to accommodate itself to any curvatures in the track.

One object of the invention is to make the frame of the truck as an integral casting and to provide outside bearing members for the journal boxes of the truck, as well as to provide inside longitudinal members from which are suspended the springs which support the center pin.

Another object of the invention is to make the integral frame independent of the radius bar, which is secured thereto by bolts or other fastenings.

The invention also relates to certain details which will be described hereinafter.

In the accompanying drawings:

Fig. 1 is a plan view of the improved locomotive truck;

Fig. 2 is a side view showing the axle box in section;

Fig. 3 is an end view of the truck;

Fig. 4 is a sectional view of one side of the truck, on the line 4—4, Fig. 2, illustrating the construction of the axle box;

Fig. 5 is a sectional view on the line 5—5, Fig. 1;

Fig. 6 is a sectional view on the line 6—6, Fig. 1;

Fig. 7 is a sectional view on the line 7—7 Fig. 6;

Fig. 8 is a view illustrating a modification, in which the radius bar is made integral with the truck.

Figure 9:
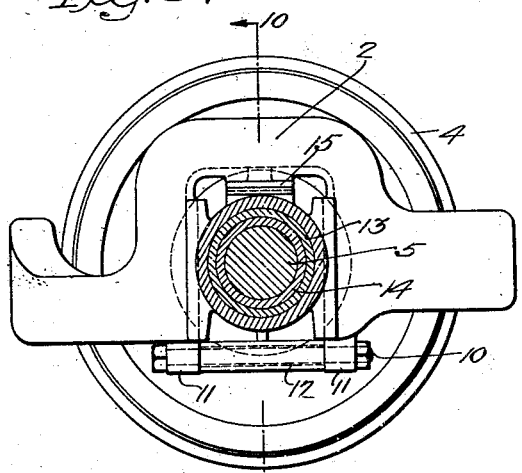
Figs. 9, 10, 11 and 12 are views illustrating other forms of axle boxes.

Referring to Figs. 1, 2 and 3, the cast metal frame 1 of the truck extends beyond the wheel base of the truck, and consists of two transverse members 17 connected at each side by inner and outer side members 3 and 2 spaced apart to allow for the wheels 4, which are mounted on the axle 5. The outside members are preferably rounded at each end. In the side members 2 are the pedestals 6 for the axle boxes 7, into which extend the ends of the axles 5.

Figure 10:
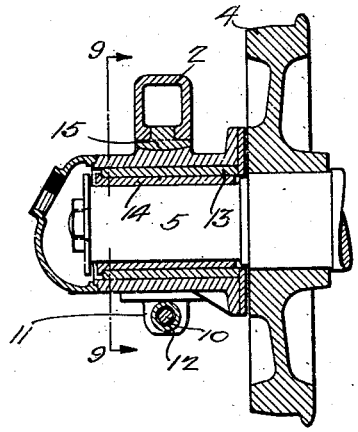

The axle boxes shown in Figs. 2 and 4 are rectangular in cross-section, as shown in Fig. 2 and have brasses 8 which rest upon the axles. The boxes are confined between the pedestals 6 and are held against the bridge portion 9 of the side members 2 by bolts 10, which extend through lugs 11 depending from the side members 2. Sleeves 12 are mounted on the bolts 10 and rest against the underside of the boxes. Other types of boxes may be used in place of the boxes shown in Fig. 2 if desired. For instance, the boxes shown in Figs. 9 and 10 may be used, in which two bearing sleeves 13 and 14 are used, the outer sleeve 13 being secured to the box and the inner sleeve 14 being located between the outer sleeve and the axle, and free to revolve on the axle and in the outer sleeve.

In Figs. 9, 10, 11 and 12 a radial seat piece 15 is shown located between the bridge portion of each side member 2 and the top of the box to take care of any slight vertical misalignment of the journal bearings. This construction may be applied to the box shown in Fig. 2 if found necessary.

Figure 11:
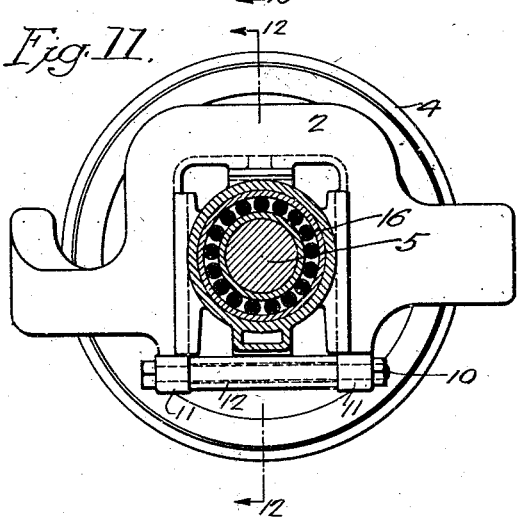
Figure 12:
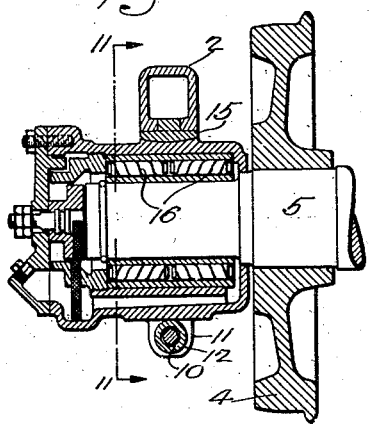

In Figs. 11 and 12 another form of box is shown which may be used with the improved frame. In this box are roller-bearings 16 of any suitable type.

The transverse members 17 of the frame are made hollow as shown in Fig. 5, and the inner longitudinal members 3—3 extend from one side member 17 to the other side member 17 of the frame 1 as supports for the swing-link blocks. These members have vertical ribs 18 at each side, making the member 3 substantial, and as these members 3—3 are integral with the frame, the entire frame is very rigid. In the members 3 are slots 19 for the spring-links of the truck. These slots are arranged in pairs on each side of the transverse center line of the truck, and between each pair of slots is a bearing-block 20 having a raised center portion 21. 22 are links which extend through the slots 19, and the links of each pair are connected by two bolts 23 at their upper ends and are adapted to the blocks 20 on each side of the projection 21.

On these bolts are sleeves 23ª in the present instance. Connecting the lower ends of each pair of links is a bolt 24 carrying a spring seat 25. The ends of the semi-elliptical springs 26 rest upon these spring seats. The links are of the well-known 3-point suspension type and permit the truck to adjust itself to the curvature of the track in the usual manner. These springs 26 are transversely arranged and are hung from the two longitudinal members 3 of the frame.

A bolster 27 rests upon the springs 26 and has a center pin 28 projecting therefrom. The bolster has depending portions 29 which extend between the two springs 26, and secured to the lower ends of the depending portions is a safety guard plate 30 secured to the bolster by bolts 31. Mounted in the bolster is a bearing pin 32 having a rounded head on which rests the end of an equalizing bar 33.

In Figs. 1 and 2 the radius bar 34 is made separate and adapted to brackets 35 projecting from the integral frame 1 by bolts 36 or other suitable fastenings. The two members 37 of the radius bar terminate in a head 38, in which is an opening 39 for the pivot pin, on which the truck swings.

Fig. 8 is a modification, in which the radius bar 34ª is made integral with the frame 1ª.

While the three-point suspension links are preferred, the links could be of the single-point suspension type without departing from the essential features of the invention.

We claim:

1. A frame for a two-wheel locomotive truck made in a single casting and consisting of two transverse members, side members projecting beyond the wheel base of the truck, and two longitudinal members at each side of the frame and spaced apart for the wheels of the truck, the inside longitudinal members being slotted for the passage of spring-suspending links.

2. The combination in a two-wheel locomotive truck, of an integral frame consisting of two transverse members, end members projecting beyond the wheel base, and two longitudinal members between the wheel bases, said members being slotted; links hung from said members and extending through the slots; transverse semi-elliptical springs hung from the links; a bolster supported by the springs; an axle; wheels on the axle, located between the inner and outer members of the frame; and an axle box mounted in the outer side members of the frame.

3. The combination in a two-wheel truck for a locomotive, of an integral frame, consisting of two transverse members, an outer side member and an inner side member at each side of the frame, said members being spaced apart; an axle; boxes on the outer members of the frame for the axle; wheels on the axle located in the space between the inner and outer members of the frame; blocks mounted on the inner members on each side of the transverse center pin of the truck; slots in the said members on each side of the blocks; links hung from the blocks; transversely arranged semi-elliptic springs supported by the links; and a bolster mounted on the springs at the center of the truck, said bolster carrying a center pin.

4. The combination in a two-wheel truck for a locomotive, of an integral frame, consisting of two transverse members, an outer side member and an inner side member at each side of the frame, said members being spaced apart; an axle, boxes on the outer member of the frame for the axle; wheels on the axle located in the space between the inner and outer members of the frame; blocks mounted on the inner members on each side of the transverse center pin of the truck; slots in the said members on each side of the blocks; links hung from the blocks; transversely arranged semi-elliptic springs carried by the links and a bolster mounted on the springs at the center of the truck, said bolster carrying a center pin, the frame having brackets spaced apart and a radius bar secured to the brackets.

5. The combination in a two-wheel locomotive truck, of a frame having two transverse members, an outside side member at each side of the frame and an inside side member at each side of the frame, said members being spaced apart; an axle; boxes in the outer side side frames; an axle mounted in the boxes; wheels on the axle located in the space between the inner and outer side members; transversely arranged semi-elliptic springs hung from the inner side members; a bolster resting upon the springs and having a pivot pin projecting therefrom, the said bolster having depending portions extending between the springs; and a safety guard plate secured to the said portions and extending under the springs.

6. An integral frame for a truck having two transverse members spaced apart, inner side members extending from one transverse member to the other and connecting said transverse members, said inner side members having upstanding flanges; and outside side members spaced from the inside members and having pedestals for the boxes for the axles of the truck, the inside members being slotted for the passage of suspension links for the springs.

7. An integral frame for a truck having two transverse members spaced apart, said members being rectangular in cross-section and hollow; inner side members extending from one transverse member to the other and connecting said transverse members, said inner side members having upstanding flanges; and outside side members spaced from the inside members and having pedestals for the boxes for the axles of the truck, the inside members being slotted for the passage of suspension links for the springs.

8. The combination in a two-wheel swing truck for locomotives and the like, of an integral frame consisting of two transverse members spaced apart, and outside side members connected to the transverse members, the outside side members being curved at each end and having pedestals; integral flanged inside members spaced from the outside members; said inside members having slots therein arranged in pairs; an axle having wheels located in the space between the inner and outer side frames; axle boxes located between pedestals of the outer frames; a block mounted on each inner frame between each set of slots; three-point suspension links hung from the blocks and extending through the slots of the inside side members; transverse springs carried by the links; a bolster mounted on the springs and having a pivot pin projecting upwardly therefrom; and a radius bar projecting from the truck.

JOHN S. KEEN.
ELLWOOD M. SHANNON.